United States Patent Office 2,704,777
Patented Mar. 22, 1955

2,704,777

PREPARATION OF HALOGENATED OLEFINES

Jared W. Clark, Charleston, W. Va., assignor to Union Carbide and Carbon Corporation, a corporation of New York No Drawing. Application January 25, 1955,
Serial No. 484,077

4 Claims. (Cl. 260—653)

This improvement relates to halogenated olefines. More particularly it is concerned with an improved process for making chlorotrifluoroethylene from 1,1,2-trichloro-1,2,2-trifluoroethane by removal of chlorine therefrom.

It is known that polychlorofluoroalkanes can be dechlorinated with zinc to yield chlorofluoroalkenes. (Locke et al., J. A. C. S. (1934), vol. 56, 1726.) The reaction is a general one which can be applied to the dehalogenation of compounds having one or more chlorine or bromine atoms on each of adjacent carbon atoms. It constitutes, also, a method for preferentially removing chlorine and bromine from compounds of this type in which fluorine is present additionally. The chlorine or bromine atoms are removed in pairs, with one atom of zinc being required to effect the removal of each pair. Thus, the dechlorination of trichlorotrifluoroethane, for instance, by this process results in the production of by-product zinc chloride in an amount which is 1.2 times that of the chlorotrifluoroethylene that is desired. This zinc chloride is finally obtained as an aqueous solution. On a large scale its disposal would constitute a difficult and serious problem since the regeneration of the zinc or the recovery of the contained halogen is not practicable, at least not at the present time. The reaction has the additional disadvantage of being carried out under pressure, in the liquid phase.

It is known also that halogens can be removed from halogenated organic compounds in the presence of hydrogen and this reaction has been applied as a quantitative procedure for the determination of the amount of halogen present. Sabatier and Maihle (Comptes rendus (1904), vol. 138, 407) have described the reaction of hexachloroethane and hydrogen over a nickel catalyst with the formation of perchloroethylene and hydrogen chloride. As far as is known, however, it was not considered that one halogen could be removed preferentially in the presence of another halogen.

The present improvement is based on my discovery that chlorine can be removed preferentially from 1,1,2-trichloro-1,2,2-trifluoroethane in the presence of hydrogen to form chlorotrifluoroethylene in good yields and efficiencies. Hydrogen chloride is formed along with the main product. The reaction is illustrated by the following equation:

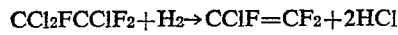

$$CCl_2FCClF_2 + H_2 \rightarrow CClF = CF_2 + 2HCl$$

The reaction can be carried out by passing a mixture of 1,1,2-trichloro-1,2,2-trifluoroethane and hydrogen through a reactor or convertor maintained at an elevated temperature. The reactor can be a length of tube made of nickel or stainless steel, for instance, which can be charged with catalyst as hereinafter described. It can be heated by known expedients, as by immersion in a heated salt bath, for instance, or by an electrical resistance. The vapors issuing from the reactor can be collected by cooling and condensation, after having first been washed to remove the hydrogen chloride, and dried.

The reaction is carried out over cobalt as a catalyst. The catalyst can be in the form of the metal or of its metal salt. For instance, it can be in the form of pellets, or of finely divided metal pressed into pellets or the catalyst in finely divided form can be deposited on a support. Also the catalyst can be in the form of its salt as for instance cobalt chloride on a support; as support material, calcium phosphate, barium phosphate and calcium fluoride phosphate are preferred. Other support materials that can also be used are graphite and activated carbon.

The ratio of hydrogen to 1,1,2-trichloro-1,2,2-trifluoroethane is not narrowly critical. At a ratio of 0.75 mol of hydrogen per mol of 1,1,2-trichloro-1,2,2-trifluoroethane it is possible to react practically all of the hydrogen which facilitates recovery of the chlorotrifluoroethylene and unreacted trichlorotrifluoroethane. Increasing the proportion of hydrogen increases the yield of chlorotrifluoroethylene but the losses to carbon and trifluoroethylene also increase. A ratio of from 0.75 to 3 mols of hydrogen per mol of 1,1,2-trichloro-1,2,2-trifluoroethane is preferred.

Losses to carbon and trifluoroethylene can also be minimized by employing lower temperatures to effect lower single pass yields. Under such conditions, however, any mechanical losses are greatly magnified in terms of decreased efficiencies. Hence, precautions are required also to minimize mechanical losses. In general, the optimum efficiencies are obtained when the single pass yields are in the range of 20 to 40 per cent, based on the 1,1,2-trichloro-1,2,2-trifluoroethane.

The actual mechanism of the dechlorination is not known. It may be that the metal functions as a catalyst by reacting to form the metal chloride which then reacts with the hydrogen to give hydrogen chloride, with the free metal being regenerated and the cycle repeated. Temperatures of 450° C. to 525° C. are preferred but higher and lower temperatures can also be used. Appreciable removal of chlorine is effected at temperatures as low as 200° C. to 400° C. with an active form of catalyst but at this temperature the reduction of metal halide is very slow so that the catalyst in the form of metal tends to be converted to the less active metal chloride and fluoride. At temperatures above 525° C. the catalytic reaction tends to become less efficient due to lessened selectivity in removing chlorine preferentially. The temperature of 525° C. approximates the practicable upper limit for efficient operation. Usable temperatures range up to 550° C., but for these higher temperature ranges a somewhat shorter contact time is recommended.

The following example is illustrative:

*Example*

A mixture of 2177 parts by weight of 1,1,2-trichloro-1,2,2-trifluoroethane with hydrogen in a mol ratio of about 1 to 1.4 was passed during a five hour period through a reactor maintained at a temperature of 400° C. to 500° C. The reactor was a stainless steel tube, made of 18-8 stainless steel, three feet long and had an inside diameter of one inch, charged with 200 milliliters of a catalyst made by evaporating to dryness an aqueous solution of 140 grams of cobalt chloride ($CoCl_2.6H_2O$) on 300 milliliters of activated carbon pellets. The space velocity was 670 liters per liter of catalyst per hour.

The reaction gases were washed, dried and the reaction product condensed and collected as in the example. Upon distilling the condensate there was obtained 249 parts of chlorotrifluoroethylene. The yield was 18.5 per cent and the efficiency 63.2 per cent based on the trichlorotrifluoroethane.

This application is in part a continuation of my copending application Serial No. 209,196, filed February 2, 1951.

What is claimed is:

1. A process for making chlorotrifluoroethylene which comprises heating a mixture of 1,1,2-trichloro-1,2,2-trifluoroethane and hydrogen in the presence of a cobalt catalyst at a temperature of at least 400° C. and not higher than 550° C.

2. A process for making chlorotrifluoroethylene which comprises heating a mixture of 1,1,2-trichloro-1,2,2-trifluoroethane and hydrogen in the presence of a cobalt catalyst at a temperature of about 450° C. to 525° C.

3. A process for making chlorotrifluoroethylene which comprises heating a mixture of 1,1,2-trichloro-1,2,2-trifluoroethane and hydrogen in a ratio of from 0.75 to 3 mols of hydrogen per mol of the 1,1,2-trichloro-1,2,2-trifluoroethane in the presence of a cobalt catalyst at a temperature of at least 400° C. and not higher than 550° C.

4. A process for making chlorotrifluoroethylene which comprises heating a mixture of 1,1,2-trichloro-1,2,2-trifluoroethane in a ratio of from 0.75 to 3 mols of hydrogen per mol of 1,1,2-trichloro-1,2,2-trifluoroethane in the presence of a cobalt catalyst at a temperature at which hydrogen chloride is formed and below the decomposition temperature of the chlorotrifluoroethylene.

No references cited.